(12) United States Patent
Tenghamn

(10) Patent No.: US 7,548,486 B2
(45) Date of Patent: Jun. 16, 2009

(54) SYSTEM FOR REDUCING TOWING NOISE IN MARINE SEISMIC SURVEY STREAMERS

(75) Inventor: Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/429,909

(22) Filed: May 8, 2006

(65) Prior Publication Data

US 2007/0258321 A1    Nov. 8, 2007

(51) Int. Cl.
   *G01V 1/38*    (2006.01)
(52) U.S. Cl. .......................................... 367/20; 367/154
(58) Field of Classification Search .................... 367/20, 367/154, 153; 174/101.5
See application file for complete search history.

(56) References Cited

U.S. PATENT DOCUMENTS

| | | | | |
|---|---|---|---|---|
| 3,480,907 | A * | 11/1969 | King ............................ | 367/154 |
| 3,518,677 | A * | 6/1970 | Florian ....................... | 367/154 |
| 4,694,436 | A | 9/1987 | Gelfand | |
| 4,897,906 | A * | 2/1990 | Bartholomew ............ | 29/890.09 |
| 4,951,265 | A * | 8/1990 | Buckles ....................... | 367/18 |
| 4,955,012 | A * | 9/1990 | Bledsoe et al. ............... | 367/154 |
| 5,046,055 | A * | 9/1991 | Ruffa ........................... | 367/154 |
| 5,777,954 | A * | 7/1998 | Hepp ............................ | 367/20 |
| 5,943,293 | A * | 8/1999 | Luscombe et al. ............ | 367/20 |
| 6,262,944 | B1 * | 7/2001 | Meyer et al. ................. | 367/154 |
| 7,142,481 | B1 * | 11/2006 | Metzbower et al. .......... | 367/154 |
| 2004/0042341 | A1 | 3/2004 | Tenghamn | |
| 2006/0023568 | A1 * | 2/2006 | Fernihough et al. ........... | 367/20 |
| 2006/0126432 | A1 * | 6/2006 | Hoogeveen ................... | 367/20 |
| 2007/0036033 | A1 * | 2/2007 | Maples et al. ................ | 367/173 |
| 2007/0064528 | A1 | 3/2007 | Metzbower et al. | |

FOREIGN PATENT DOCUMENTS

| | | |
|---|---|---|
| GB | 2 162 638 | 2/1986 |
| GB | 2 421 078 | 6/2006 |
| GB | 2435094 | 8/2007 |

OTHER PUBLICATIONS

S.P. Beerens, S. P. Van Ijsselmuide, C. Volwerk, *"Flow Noise Analysis of Towed Sonar Arrays"*, UDT99—Conference Proceedings Undersea Defense Technology, Jun. 29-Jul. 1, 1999, Nice, France, Nexus Media Limited, Swanley, Kent.

* cited by examiner

*Primary Examiner*—Ian J Lobo
(74) *Attorney, Agent, or Firm*—E. Eugene Thigpen; Richard A. Fagin

(57) ABSTRACT

A seismic streamer includes a jacket covering an exterior of the streamer. At least one strength member extends along the length of the jacket. The strength member is disposed inside the jacket. At least one seismic sensor is disposed in an interior of the jacket. An acoustically transparent material fills void space in the interior of the jacket. At least one longitudinally compressible element is disposed at a selected position along the streamer. The longitudinally compressible element fills substantially all void space within a cross-section of the interior of the jacket to separate the material into two compartments, thus attenuating transmission of acoustic waves in the material across the element.

9 Claims, 7 Drawing Sheets

SYSTEM FOR REDUCING TOWING NOISE IN MARINE SEISMIC SURVEY STREAMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey apparatus and methods. More specifically, the invention relates to structures for marine seismic streamers that have reduced noise induced by effects of towing such streamers in the water.

2. Background Art

In a marine seismic survey, a seismic vessel travels on the surface of a body of water such as a lake or the ocean. The seismic vessel typically contains seismic acquisition control equipment, which includes devices such as navigation control, seismic source control, seismic sensor control, and signal recording devices. The seismic acquisition control equipment causes a seismic source towed in the body of water, by the seismic vessel or another vessel, to actuate at selected times. The seismic source may be any type well known in the art of seismic acquisition, including air guns or water guns, or most commonly, arrays of air guns. Seismic streamers, also called seismic cables, are elongate cable-like structures that are towed in the body of water by the seismic survey vessel or by another vessel. Typically, a plurality of seismic streamers is towed behind the seismic vessel laterally spaced apart from each other. The seismic streamers contain sensors to detect the seismic wavefields initiated by the seismic source and reflected from acoustic impedance boundaries in the subsurface Earth formations below the water bottom.

Conventionally, seismic streamers contain pressure-responsive sensors such as hydrophones, but seismic streamers have also been proposed that contain particle motion sensors, such as geophones, in addition to hydrophones. The sensors are typically located at regular intervals along the length of seismic streamers.

Seismic streamers also include electronic components, electrical wiring and may include other types of sensors. Seismic streamers are typically assembled from sections, each section being approximately 75 meters in length. A number of such sections are joined end to end, and can extend the assembled streamer to a total length of many thousands of meters. Position control devices, such as depth controllers, paravanes, and tail buoys are affixed to the streamer at selected positions and are used to regulate and monitor the movement of the streamer in the water. During operation, the seismic sources and streamers are typically submerged at a selected depth in the water. The seismic sources are typically operated at a depth of 5-15 meters below the water surface and the seismic streamers are typically operated at a depth of 5-40 meters.

A typical streamer section consists of an external jacket, connectors, spacers, and strength members. The external jacket is formed from a flexible, acoustically transparent material such as polyurethane and protects the interior of the streamer section from water intrusion. The connectors are disposed at the ends of each streamer section and link the section mechanically, electrically and/or optically to adjacent streamer sections and, therefore, ultimately link it to the seismic towing vessel. There is at least one, and are usually two or more such strength members in each streamer section that extend the length of each streamer section from one end connector to the other. The strength members provide the streamer section with the capability to carry axial mechanical load. A wire bundle also extends the length of each streamer section, and can contain electrical power conductors and electrical data communication wires. In some instances, optical fibers for signal communication are included in the wire bundle. Hydrophones or groups of hydrophones are located within the streamer section. The hydrophones have sometimes been located within corresponding spacers for protection. The distance between spacers is ordinarily about 0.7 meters. A hydrophone group, typically comprising 16 hydrophones, thus extends for a length of about 12.5 meters.

The interior of the seismic streamers is filled with a void filling material to provide buoyancy and desired acoustic properties. Most seismic streamers have been filled with a liquid core material, such as oil or kerosene. Such liquid-filled streamer design is well proven and has been used in the industry for a long time. However, there are disadvantages associated with using liquid as a core fill material. The first disadvantage is leakage of the liquid into the surrounding water in the event a streamer section is damaged. Such leakage self-evidently presents a serious environmental problem. Damage can occur while the streamer is being towed through the water or it can occur while the streamer is being deployed from or retrieved onto a streamer winch on which streamers are typically stored on the seismic vessel.

A second disadvantage to using liquid-filled streamer sections is noise induced in the hydrophones generated by vibrations as the streamer is towed through the water. Such vibrations develop internal pressure waves that travel through the liquid in the streamer sections, such waves often referred to as "bulge waves" or "breathing waves." The foregoing noise is described, for example, in S. P. Beerens et al., *Flow Noise Analysis of Towed Sonar Arrays*, UDT 99—Conference Proceedings Undersea Defense Technology, Jun. 29-Jul. 1, 1999, Nice, France, Nexus Media Limited, Swanley, Kent.

Ideally, in a streamer moving at constant speed, all the streamer components including the jacket, the connectors, the spacers, the strength members, wire bundle, sensors and liquid void filling material all move at the same constant speed and do not move relative to each other. Under actual movement conditions, however, transient motion of the streamers takes place, such transient motion being caused by events such as pitching and heaving of the seismic vessel, movement of the paravanes and tail buoys attached to the streamers, strumming of the towing cables attached to the streamers caused by vortex shedding on the cables, and operation of depth-control devices located on the streamers. Any of the foregoing types of transient motion can cause transient motion (stretching) of the strength members.

Transient motion of the strength members displaces the spacers or connectors, causing pressure fluctuations in the liquid void filling material that are detected by the hydrophones. Pressure fluctuations radiating away from the spacers or connectors also cause the flexible outer jacket to compress in and bulge out in the form of a traveling wave, giving the phenomenon "bulge waves" its name.

In addition, there are other types of noise, often called "flow noise", which can affect the quality of the seismic signal detected by the hydrophones. For example, vibrations of the seismic streamer can cause extensional waves in the outer jacket and resonance transients traveling down the strength members. A turbulent boundary layer created around the outer jacket of the streamer by the act of towing the streamer can also cause pressure fluctuations in the liquid core-filling material. In liquid filled streamer sections, the extensional waves, resonance transients, and turbulence-induced noise are typically much smaller in amplitude than the bulge waves, however they do exist and affect the quality of the seismic signals detected by the hydrophones. Bulge waves are usually the largest source of vibration noise because these waves travel in the liquid core material filling the streamer sections and thus act directly on the hydrophones.

Several concepts have been proposed to reduce such noise in steamer sections. For example, it is known in the art to introduce compartment blocks in liquid-filled streamer sections to stop bulge waves from traveling continuously along the entire length of the streamer. It is also known in the art to introduce open cell foam into the interior of the streamer section. The open cell foam restricts the flow of the liquid void filling material in response to transient-motion induced pressure changes and causes the energy to be dissipated into the outer jacket and the foam over a shorter axial distance. Another approach known in the art to address such noise is to combine several hydrophones into a series-connected group to attenuate the effects of a slow moving wave on the detected seismic signal. Typically, such approach is implemented by positioning an equal number of series connected hydrophones between or on both sides of selected spacers so that pairs of hydrophones sense equal and opposite pressure changes. Summing the hydrophone signals from such a group can then substantially cancel such noise.

Another approach to eliminating bulge waves is to eliminate the liquid from the interior of streamer sections, so that no medium exists in which bulge waves can develop. This approach is exemplified by the use of so-called solid streamers, using streamer sections filled with a solid core material. However, in any type of solid material, some shear waves will develop, which can increase the noise detected by the hydrophones. Shear waves cannot develop in liquid filled streamers because liquids have no shear modulus. Additionally, many conventional solid core materials are not acoustically transparent to the pressure waves that the hydrophones are intended to detect.

Another approach to the noise problem is to replace the liquid core material in a streamer section with a soft, flexible solid core material, such as gel. The introduction of a softer, flexible solid material may block the development of bulge waves compared to a liquid core material. A soft, flexible solid material may also attenuate the transmission of shear waves as compared to a harder material. However, there can still be a substantial transmission of shear waves through such soft, flexible solid material.

Using a soft, flexible material will eliminate a substantial portion of the problem with "bulge waves", but the so-called Poisson effect from the strength members can increase. Because of the relatively high tensile stiffness of the strength members, transients generally travel along the strength members at velocities near to or greater than that of the sound velocity in water, such velocities typically in the range of 1000 to 1500 meters per second. The actual velocity of transients along the strength members depends mainly on the elastic modulus of the strength member material and the tension applied to the streamer as it is towed in the water. The lower the elastic modulus the more compliant the streamer will be, and thus the more transient energy it will dissipate as heat and the less will pass through the strength member. Special elastic sections are normally placed at either end of a streamer cable to reduce the effects of transients.

A streamer traveling through the water may be considered to have an inertial mass represented by M that is subject to viscous damping represented by c. If the spring constant of the elastic sections is k, then the simplified transfer function of the elastic sections can be derived by solving the equation of motion as:

$$h = \frac{1}{\sqrt{\left(1 - \frac{\omega^2}{\omega_n^2}\right)^2 + \left(2\delta\frac{\omega}{\omega_n}\right)^2}} \quad (1)$$

where $\omega_n = \sqrt{(k/M)}$, and $\delta = c/2\omega_n$. This transfer function has the form of a mechanical high-cut filter above the resonant frequency of $\omega = \omega_n$. The elastic modulus of any type of section also determines the transient wave velocity. The transient wave velocity may be represented by the expression:

$$C = \sqrt{E/M} \quad (2)$$

where C is the velocity that a transient will travel in the stress member, E is the elastic modulus, and M is the mass per unit length. For any particular stress member material, the stiffness will normally increase with strength more than the mass per unit length and the velocity will also increase. Knowledge of this velocity may be useful in formulating the design of the streamer hydrophone array for noise rejection.

A related property is the mechanical impedance. The impedance, Z, may be determined by the expression:

$$Z = \sqrt{E*M} \quad (3)$$

Changes in the impedance may affect the relative degree of propagation and reflection of transient waves along the streamer.

There is still a need to further improve the attenuation of longitudinal waves transmitted through the strength members of marine seismic streamers.

SUMMARY OF THE INVENTION

One aspect of the invention is a seismic streamer. A seismic streamer according to this aspect of the invention includes a jacket covering an exterior of the streamer. At least one strength member extends along the length of the jacket. The strength member is disposed inside the jacket. At least one seismic sensor is disposed in an interior of the jacket. An acoustically transparent material fills void space in the interior of the jacket. At least one longitudinally compressible element is disposed at a selected position along the streamer. The element fills substantially all void space within a cross-section of the interior of the jacket to separate the material into two adjacent compartments, thus attenuating transmission of acoustic waves in the material across the element.

Other aspects and advantages of the invention will be apparent from the following description and the appended claims.

DETAILED DESCRIPTION

Figure 1:
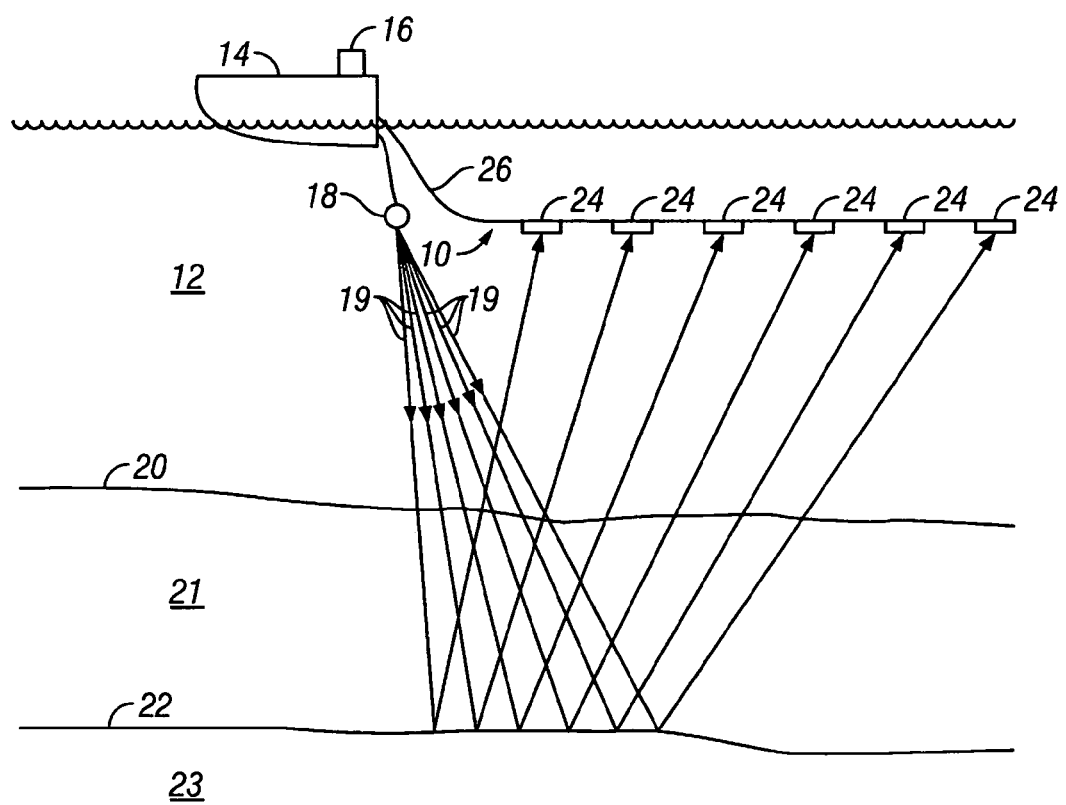
FIG. 1 shows typical marine seismic data acquisition using a streamer according to one embodiment of the invention.
Figure 4:
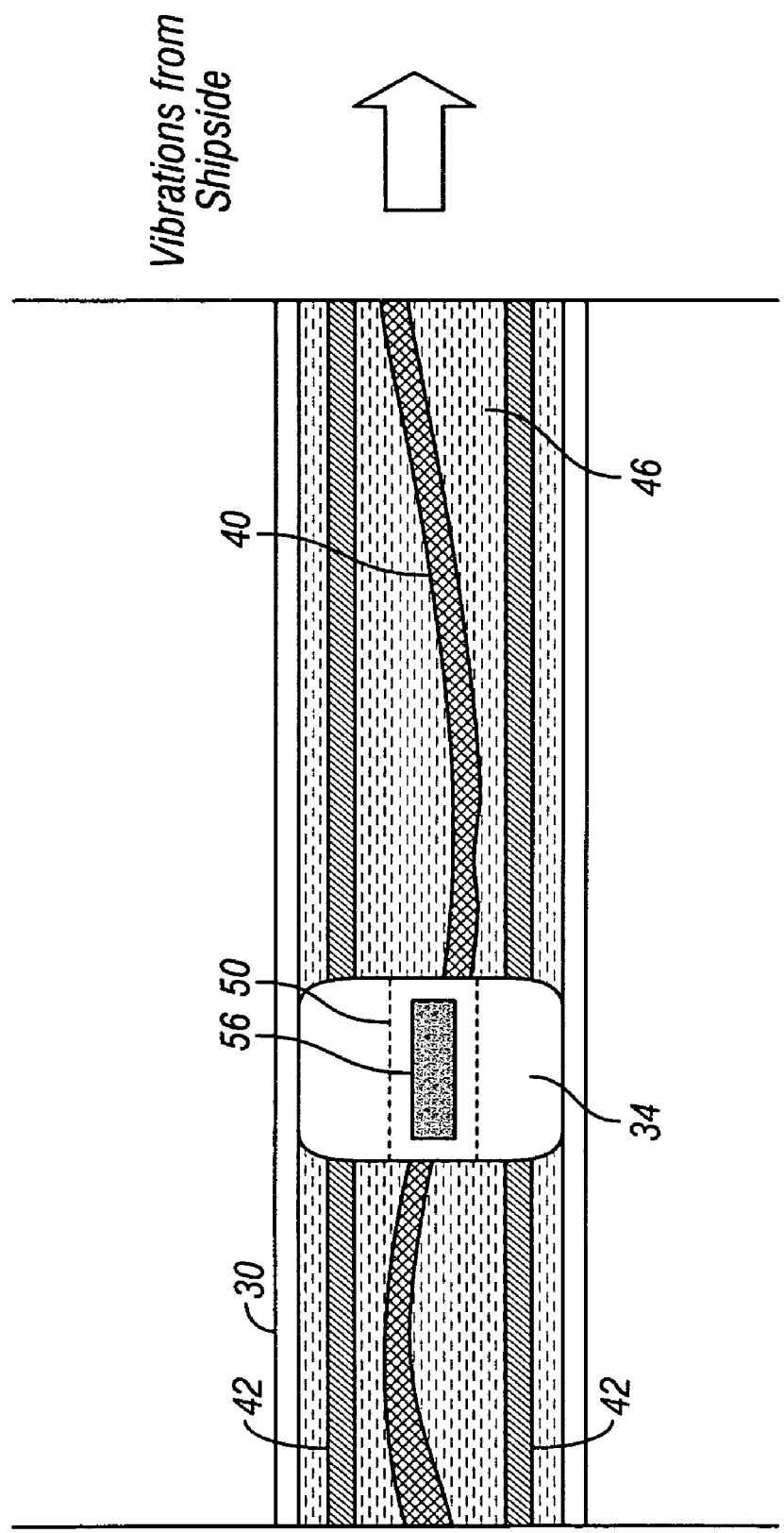
FIG. 4 shows one embodiment of assembly of a seismic sensor to a spacer according to the invention.

FIG. 1 shows an example marine seismic data acquisition system as it is typically used on acquiring seismic data. A seismic vessel 14 moves along the surface of a body of water 12 such as a lake or the ocean. The marine seismic survey is intended to detect and record seismic signals related to structure and composition of various subsurface Earth formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such sources in the water 12. The seismic vessel 14 or a different vessel tows at least one seismic streamer 10 near the surface of the water 12. The streamer 10 is coupled to the vessel 14 by a lead in cable 26. A plurality of sensor elements 24, or arrays of such sensor elements, are disposed at spaced apart locations along the streamer 10. The sensor elements 24, as will be explained in more detail below with reference to FIG. 4, are formed by mounting a seismic sensor inside a sensor spacer.

During operation, certain equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor element 24. Structure of the formations 21, 23, among other properties of the Earth's subsurface, can be inferred by travel time of the energy 19 and by characteristics of the detected energy such as its amplitude and phase.

Figure 2:
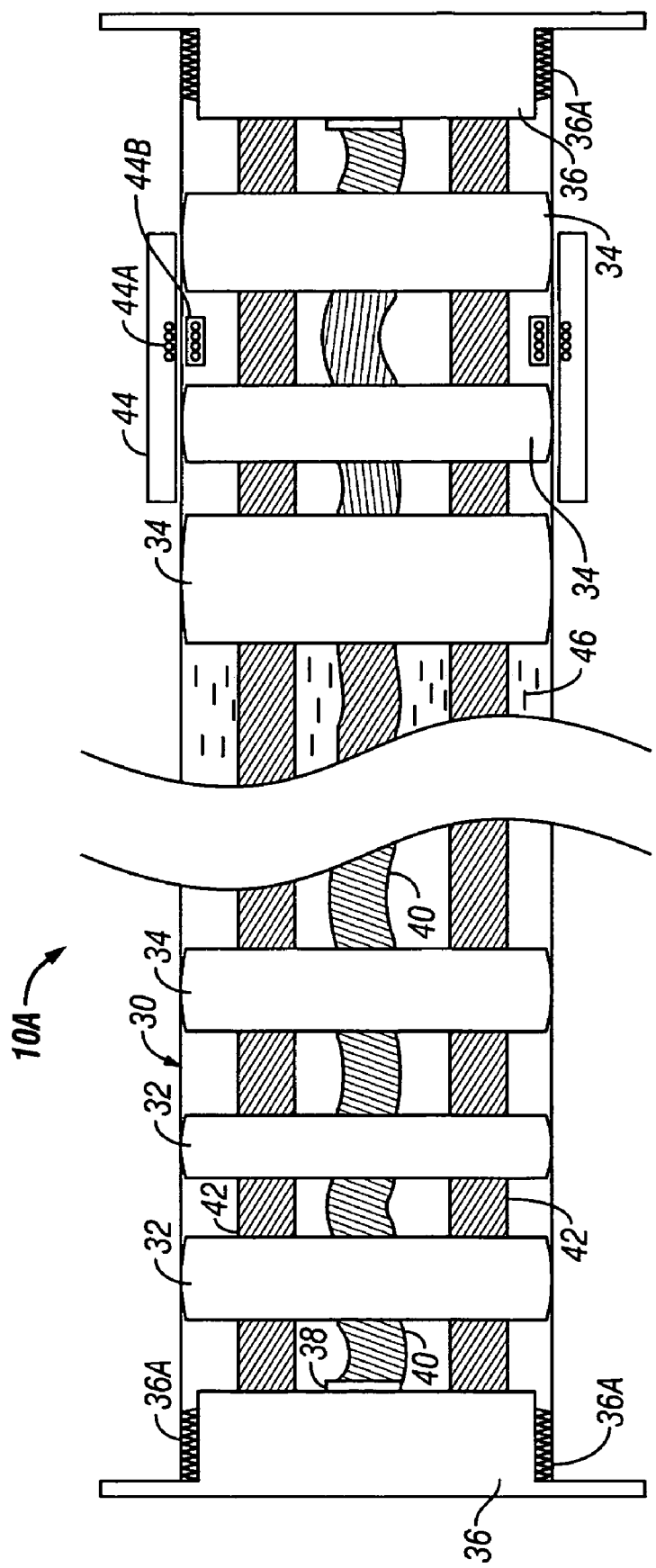
FIG. 2 shows a cut away view of one embodiment of a streamer segment according to the invention.

Having explained the general method of operation of a marine seismic streamer, an example embodiment of a streamer according to the invention will be explained with reference to FIG. 2. FIG. 2 is a cut away view of a portion (segment) 10A of a typical marine seismic streamer (10 in FIG. 1). A streamer as shown in FIG. 1 may extend behind the seismic vessel (14 in FIG. 1) for several kilometers, and is typically made from a plurality of streamer segments 10A as shown in FIG. 2 connected end to end behind the vessel (14 in FIG. 1).

The streamer segment 10A in the present embodiment may be about 75 meters overall length. A streamer such as shown at 10 in FIG. 1 thus may be formed by connecting a selected number of such segments 10A end to end. The segment 10A includes a jacket 30, which in the present embodiment can be made from 3.5 mm thick transparent polyurethane and has a nominal external diameter of about 62 millimeters. In each segment 10A, each axial end of the jacket 30 may be terminated by a coupling/termination plate 36. The coupling/termination block 36 may include rib elements 36A on an external surface of the coupling/termination block 36 that is inserted into the end of the jacket 30, so as to seal against the inner surface of the jacket 30 and to grip the coupling/termination block 36 to the jacket 30 when the jacket 30 is secured by and external clamp (not shown). In the present embodiment, two strength members 42 are coupled to the interior of each coupling/termination block 36 and extend the length of the segment 10A. In a particular implementation of the invention, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown in FIG. 2), the mating coupling/termination blocks 36 are coupled together using any suitable connector, so that the axial force is transmitted through the coupling/termination blocks 36 from the strength members 42 in one segment 10A to the strength member in the adjoining segment.

The segment 10A can include a number of buoyancy spacers 32 disposed in the jacket 30 and coupled to the strength members 42 at spaced apart locations along their length. The buoyancy spacers 32 may be made from foamed polyurethane or other suitable, selected density material. The buoyancy spacers 32 have a density selected to provide the segment 10A preferably with approximately the same overall density as the water (12 in FIG. 1), so that the streamer (10 in FIG. 1) will be substantially neutrally buoyant in the water (12 in FIG. 1). As a practical matter, the buoyancy spacers 32 provide the segment 10A with an overall density very slightly less than that of fresh water. Appropriate overall density may then be adjusted in actual use by adding selected buoyancy spacers 32 and fill media having suitable specific gravity.

The segment 10A includes a generally centrally located conductor cable 40 which can include a plurality of insulated electrical conductors (not shown separately), and may include one or more optical fibers (not shown). The cable 40 conducts electrical and/or optical signals from the sensors (which will be further explained below with reference to FIGS. 3 and 4) to the recording system (16 in FIG. 1). The cable 40 may in some implementations also carry electrical power to various signal processing circuits (not shown separately) disposed in one or more segments 10A, or disposed elsewhere along the streamer (10 in FIG. 1). The length of the conductor cable 40 within a cable segment 10A is generally longer than the axial length of the segment 10A under the largest expected axial stress on the segment 10A, so that the electrical conductors and optical fibers in the cable 40 will not experience any substantial axial stress when the streamer 10 is towed through the water by a vessel. The conductors and optical fibers may be terminated in a connector 38 disposed in each coupling/termination block 36 so that when the segments 10A are connected end to end, corresponding electrical and/or optical connections may be made between the electrical conductors and optical fibers in the conductor cable 40 in adjoining segments 10A.

Sensors, which in the present embodiment may be hydrophones, can be disposed inside sensor spacers, shown in FIG. 2 generally at 34. The hydrophones in the present embodiment can be of a type known to those of ordinary skill in the art, including but not limited to those sold under model number T-2BX by Teledyne Geophysical Instruments, Houston, Tex. In the present embodiment, each segment 10A may include 96 such hydrophones, disposed in arrays of sixteen individual hydrophones connected in electrical series. In a particular implementation of the invention, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer (10 in FIG. 1). It should be clearly understood that the types of sensors used, the electrical and/or optical connections used, the number of such sensors, and the spacing between such sensors are only used to illustrate one particular embodiment of the invention, and are not intended to limit the scope of this invention. In other embodiments, the sensors may be particle motion sensors such as geophones or accelerometers. A marine seismic streamer having particle motion sensors is described in U.S. patent application Ser. No. 10/233,266, filed on Aug. 30, 2002, entitled, Apparatus and Method for Multicomponent Marine Geophysical Data Gathering, assigned to an affiliated company of the assignee of the present invention and incorporated herein by reference.

At selected positions along the streamer (10 in FIG. 1) a compass bird 44 may be affixed to the outer surface of the jacket 30. The compass bird 44 includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481,611 issued to Burrage and incorporated herein by reference.

In the present embodiment, the interior space of the jacket 30 may be filled with a material 46 such as "BVF" (Buoyancy Void Filler), which may be a curable, synthetic urethane-based polymer. The BVF 46 serves to exclude fluid (water) from the interior of the jacket 30, to electrically insulate the various components inside the jacket 30, to add buoyancy to a streamer section and to transmit seismic energy freely through the jacket 30 to the sensors 34. The BVF 46 in its uncured state is essentially in liquid form. Upon cure, the BVF 46 no longer flows as a liquid, but instead becomes substantially solid. However, the BVF 46 upon cure retains some flexibility to bending stress, substantial elasticity, and freely transmits seismic energy to the sensors 34. It should be understood that the BVF used in the present embodiment only is one example of a gel-like substance that can be used to fill the interior of the streamer. Other materials could be also used. For example, heating a selected substance, such as a thermoplastic, above its melting point, and introducing the melted plastic into the interior of the jacket 30, and subsequent cooling, may also be used in a streamer according to the invention. Oil or similar material may also be used to fill the interior of the streamer.

The sensor spacers 34, as explained in the Background section herein, are typically molded from a rigid, dense plastic to better protect the seismic sensors therein from damage during handling and use. While effective in reducing incidence of damage to the seismic sensors, the rigid plastic used in the sensor spacers 34 also efficiently couples noise from the strength members 42 to the seismic sensor therein. Also as explained in the Background section herein, one source of noise is the Poisson Effect, wherein stretching of the strength members 42 under axial tension causes them to undergo a reduction in diameter. When the axial tension is reduced on the strength members 42, they increase diameter. The strength members 42 are typically tightly fit in, and adhesively bonded to through passages (52 in FIGS. 3 and 4) in the sensor spacers 34, and thus diameter changes in the strength members 42 are efficiently transferred to the sensor spacers 34, thus providing a source of noise that can be detected by the seismic sensors.

Figure 3:
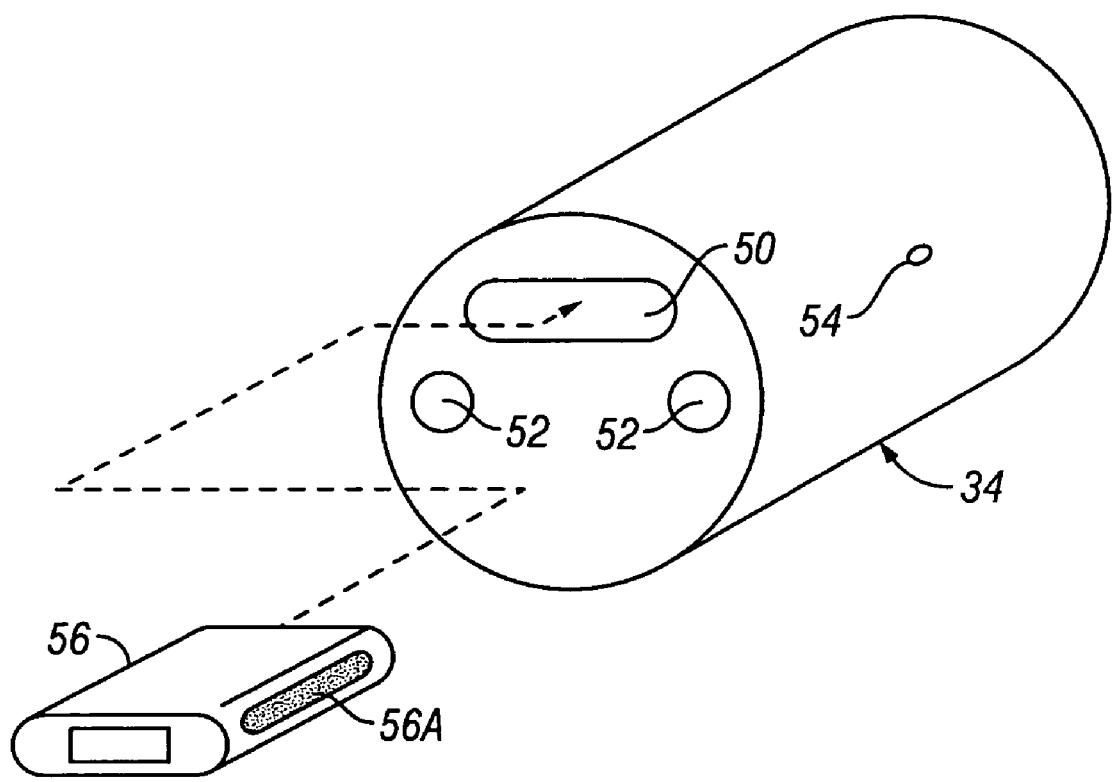
FIG. 3 shows a prior art assembly of a seismic sensor to a spacer.

FIG. 3 illustrates a manner known in the art in which seismic sensors are mounted in the sensor spacers. The spacer 34 includes an opening 50 shaped to accept a seismic sensor 56. The sensor 56 in this embodiment can be the model number T-2BX hydrophone made by Teledyne Geophysical Instruments, explained above with reference to FIG. 2. The housing of the sensor 56 includes ribs 56 A on its lateral edges, such that when the sensor 56 is inserted into the opening 50, the sensor 56 is retained in the opening 50 by interference fit. The spacer 34 also includes through passages 52 through which the strength members (42 in FIG. 2) are inserted. An adhesive port 54 is provided on the spacer 34, and into which adhesive (not shown) is injected after the strength members (42 in FIG. 2) are inserted into the through passages 52.

One embodiment of a streamer section according to the invention is shown in cut away view in FIG. 4. The streamer section in FIG. 4 includes substantially all of the components of the streamer section shown in FIG. 2. In the present embodiment, however, the sensor spacer 34 includes an interior cavity 50 that is sized to substantially eliminate any direct contact between the spacer 34 and the sensor 56. The interior cavity 50 may be filled with soft, closed cell foam, gel or other material that effectively acoustically isolates the sensor 56 from the spacer 34.

Figure 5:
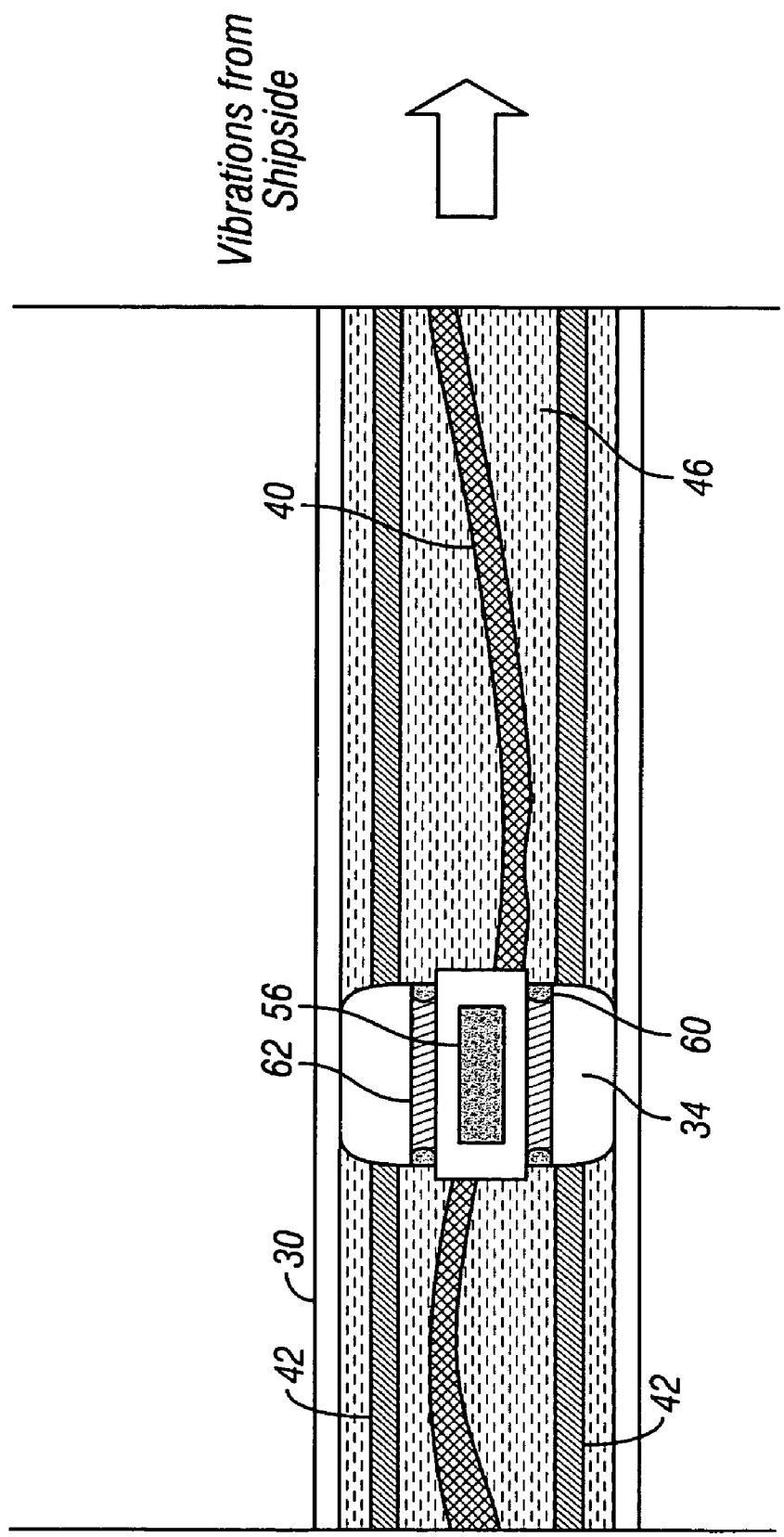
FIG. 5 shows another embodiment of assembly of a seismic sensor to a spacer according to the invention.

In another embodiment, shown in FIG. 5, the sensor 56 is mounted inside a rigid tube 62, such as can be made from polyvinyl chloride or similar plastic, or other rigid material. The interior cavity 50 in the sensor spacer 34 is sized such that the tube 62 does not contact the cavity 50 wall. The tube 62 may be suspended inside the cavity 50 by means of o-rings 60 or similar compliant device that effectively acoustically isolates the tube 62 from the spacer 34.

Figure 6:
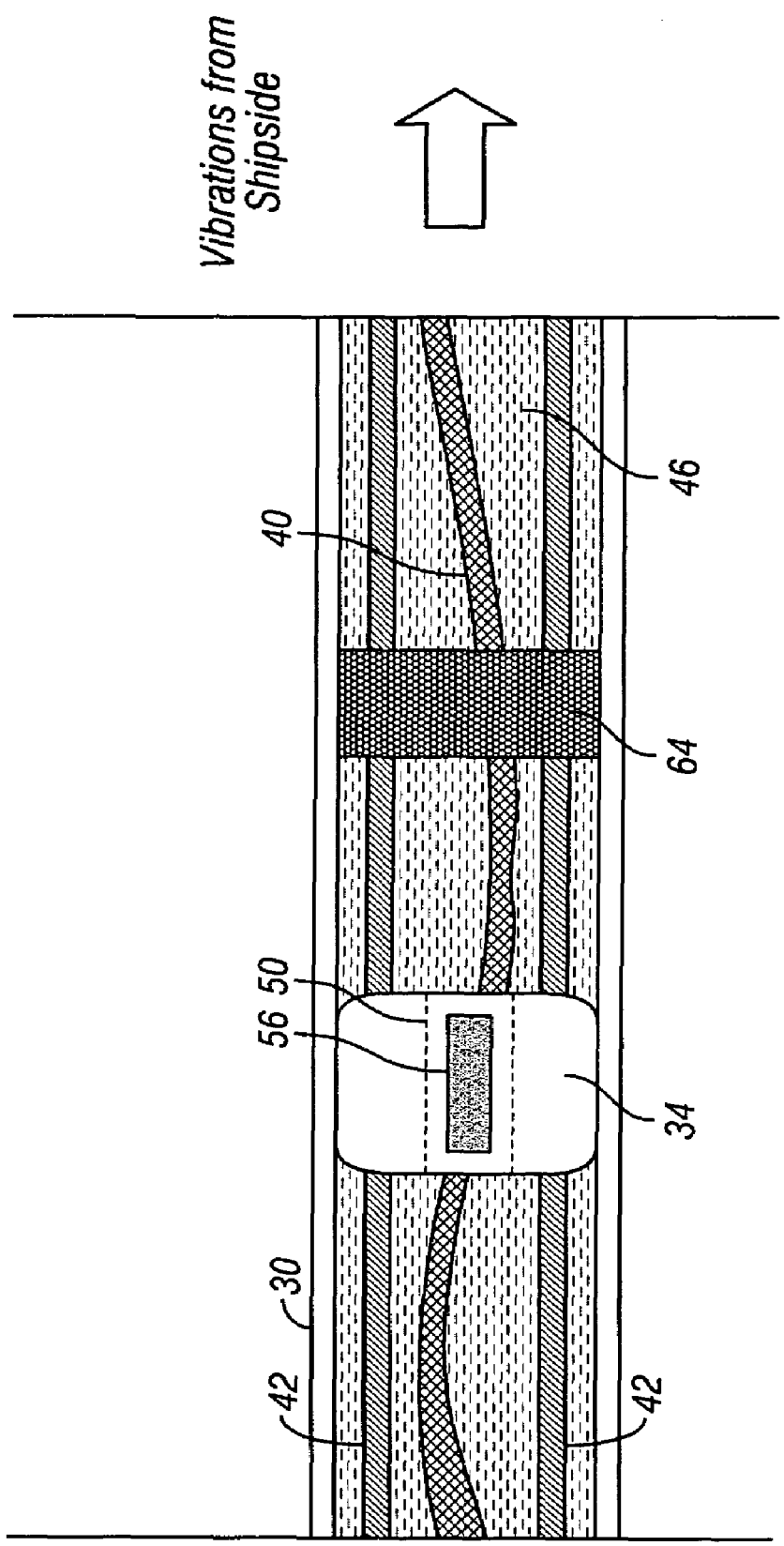
FIG. 6 shows an embodiment of a streamer having a longitudinally compressible element within the streamer jacket.

Referring to FIG. 6, the fill material (46 in FIG. 2) in the interior of the jacket 30 may be segregated into discrete compartments by including one or more longitudinally compressible elements 64 at selected positions along the length of each streamer section. The longitudinally compressible element 64 fills substantially the entire cross section of the interior of the jacket 30, other than the portion occupied by components such as the strength member(s) 42 and the cable 40. The longitudinally compressible element 64 serves to attenuate movement of pressure waves along the length of the streamer because of its relatively high compressibility in the longitudinal direction. In some embodiments, a plurality of such longitudinally compressible elements may be included in the streamer at spaced apart locations from each other so as to segregate the interior of the streamer into a plurality of compartments For example, one such compressible element may be included for each spacer, whether a sensor spacer or a buoyancy spacer. In one embodiment, the longitudinally compressible element 64 can be made from closed-cell foam such as polyurethane. The density and compressibility of such closed cell foam is a matter of discretion for the designer of the streamer section, however it is within the scope of this invention for the foam to have a compressibility of at least five, and preferably 100 or more times the compressibility of the void fill material (46 in FIG. 2) such that compressional waves in the void fill material (46 in FIG. 2) caused by relative movement of the spacers are substantially absorbed by the longitudinally compressible element 64. The term "longitudinally compressible element" is used in the present description to indicate that a preferred mechanical property of the element 64 is that it has the described compressibility along the direction of the length of the streamer, while preferably having relatively lower compressibility in any direction transverse to the length of the streamer section, so as not to compromise the strength of the streamer section.

Figure 7:
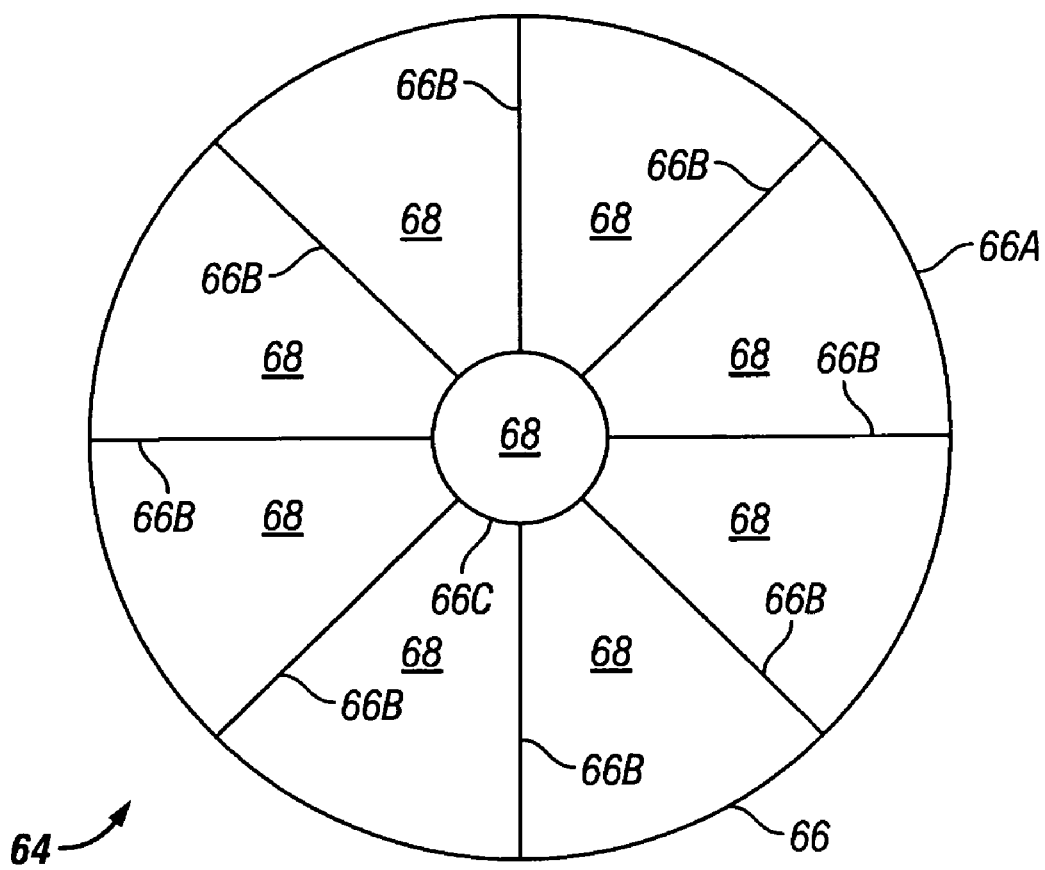
FIG. 7 shows one embodiment of a longitudinally compressible element.

An example structure for a longitudinally compressible element having the foregoing mechanical properties will be explained with reference to a cross-sectional view thereof in FIG. 7. The longitudinally compressible element 64 may include a frame 66 such as may be made from steel, aluminum or other high strength material. The frame 66 may include an external cylinder 66A, radially inwardly extending ribs 66B and an internal cylinder 66C substantially as shown in FIG. 7. All the void space between the cylinders 66A, 66C and ribs 66B may be filled with closed cell foam 68 as described above. The cylinders 66A, 66C and ribs 66B may extend in a longitudinal direction for a length substantially the same as that of the foam 68, which can be on the order of 5 to 20 centimeters for each such longitudinally compressible element 64. Other structures may be devised which have similar mechanical properties, namely, that the longitudinally compressible element 64 provides compressibility at least as much as the void fill material (46 in FIG. 2) transversely to the length of the streamer, and provides substantially more compressibility in a direction along the length of the streamer. For the example embodiment shown in FIG. 7, it is preferable that the dimensions of the components of the frame 66 occupy no more than a small fraction, for example 3 to 5 percent, of the cross-sectional area of the streamer, leaving the foam 68 to occupy substantially all the cross-sectional area. By selecting such frame dimensions, the frame 66 will present substantially no resistance to movement of fluid waves in the void fill material (46 in FIG. 2), thus not compromising the performance of the longitudinally compressible element 64.

A streamer made as described herein may provide substantially reduced effect of "v-waves" than streamers made according to structures known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer, comprising:
   a jacket covering an exterior of the streamer;
   at least one strength member extending along the length of the jacket, the strength member disposed inside the jacket;
   at least one seismic sensor disposed in an interior of the jacket;
   an acoustically transparent material filling void space in the interior of the jacket, the acoustically transparent material introduced into the jacket in liquid form and undergoing state change to substantially solid form thereafter; and
   at least one longitudinally compressible element made from closed cell foam disposed at a selected position along the streamer, the at least one longitudinally compressible element filling substantially all void space within a cross-section of the interior of the jacket to separate the void filling material into two adjacent compartments so as to attenuate transmission of acoustic waves in the material across the element, the longitudinally compressible element including a frame configured to substantially resist compression in a direction transverse to a length of the streamer, and closed cell foam filling void space in the frame so as to provide substantial compressibility in a direction alone the length of the streamer.

2. The streamer of claim 1 wherein the jacket comprises polyurethane.

3. The streamer of claim 1 wherein the at least one strength member comprises fiber rope.

4. The streamer of claim 3 further comprising two strength members.

5. The streamer of claim 1 further comprising buoyancy spacers disposed along the strength member and inside the jacket at spaced apart locations, the spacers having a density selected to provide the streamer with a selected overall density.

6. The streamer of claim 5 wherein the buoyancy spacers comprise foamed polyurethane.

7. The streamer of claim 1 further comprising a cable disposed inside the jacket, the cable having at least one of electrical conductors and an optical fiber, the cable adapted to carry signals from the at least one seismic sensor to a recording system.

8. The streamer of claim 1 wherein the at least one sensor comprises a hydrophone.

9. The streamer of claim 1 further comprising a termination plate coupled to each axial end of the jacket, the termination plates each coupled to the strength member at an axial end thereof, the termination plates adapted to couple to a corresponding termination plate in another segment of the streamer so as to transmit axial force therethrough.

* * * * *